United States Patent [19]
Nakai et al.

[11] Patent Number: 5,539,523
[45] Date of Patent: Jul. 23, 1996

[54] IMAGE FORMING DEVICE MAKING COLOR CORRECTIONS ON STORED IMAGE DATA

[75] Inventors: Yoshiyuki Nakai, Nara; Tuyoshi Takeno, Yamatokooriyama, both of Japan

[73] Assignee: Sharp Kabushiki Kaisha, Osaka, Japan

[21] Appl. No.: 124,988

[22] Filed: Sep. 22, 1993

[30] Foreign Application Priority Data

Nov. 27, 1992 [JP] Japan .................. 4-341721

[51] Int. Cl.$^6$ .................. H04N 1/23; H04N 1/56; H04N 1/60; G06K 9/46
[52] U.S. Cl. .................. 358/296; 358/504; 358/518; 358/527; 382/118; 382/165; 382/190
[58] Field of Search .................. 358/296, 298, 358/406, 448, 452, 453, 456, 457, 461, 504, 505, 515, 517–524, 527, 530, 534, 535, 538, 540; 382/118, 162–170, 190, 191, 257, 258, 274, 276, 282, 283, 308, 312, 318, 319

[56] References Cited

U.S. PATENT DOCUMENTS

| | | | |
|---|---|---|---|
| 4,007,362 | 2/1977 | Sindermann | 235/151 |
| 4,929,978 | 5/1990 | Kanamori et al. | 355/38 |
| 4,937,662 | 6/1990 | Matsunawa et al. | 358/538 |
| 5,018,008 | 5/1991 | Asada | 358/518 |
| 5,049,985 | 9/1991 | Outa | 358/530 |
| 5,132,788 | 7/1992 | Hirota | 358/518 X |
| 5,136,401 | 8/1992 | Yamamoto et al. | 358/518 X |
| 5,142,355 | 8/1992 | Fujima | 358/515 |
| 5,440,409 | 8/1995 | Sugano et al. | 382/165 X |
| 5,442,716 | 8/1995 | Otsu et al. | 382/190 X |

FOREIGN PATENT DOCUMENTS

| | | | |
|---|---|---|---|
| 0354490 | 2/1990 | European Pat. Off. | H04N 1/46 |
| 2360270 | 6/1974 | Germany | G03F 3/00 |
| 60-91770 | 5/1985 | Japan | H04N 1/40 |
| 4-323957 | 11/1992 | Japan | H04N 1/40 |
| 1400806 | 9/1975 | United Kingdom | H04N 1/00 |
| 8200902 | 3/1982 | WIPO | G03F 3/08 |

OTHER PUBLICATIONS

Miyake, Y., et al., "Facial Pattern Detection and Color Correction from Television Picture for Newspaper Printing", *Journal of Imaging Technology*, vol. 16, No. 5, Oct. 1990, pp. 165–169.

*Primary Examiner*—Peter S. Wong
*Assistant Examiner*—Eric Frahm
*Attorney, Agent, or Firm*—David G. Conlin; Kevin J. Fournier

[57] ABSTRACT

Any specific color (e.g., flesh-color, sky-blue and so on) is determined for its area on an original color image and corrected by the use of a matrix color correcting factor to assure a high level of reproduction of that color. Any specific color, for example flesh color, is previously extracted by pre-scanning (S1, S2). An area of the color is determined by counting its pixels included therein (S3). The determined area S of the specific color is compared with a given value C (S4). When S<C, a usual color correction is made (S6). When S>C, another kind of color correction is made (S9, S10). An area of each color is extracted (S9) and a suitable correction factor is selected (S10). All colors are separately corrected by using respectively selected correction factors, that assures a high-quality reproduction of the color image to be printed.

2 Claims, 12 Drawing Sheets

FIG.15A
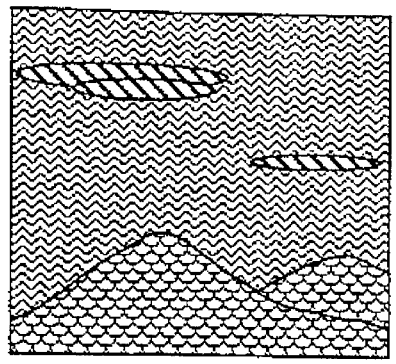
FIG.15B
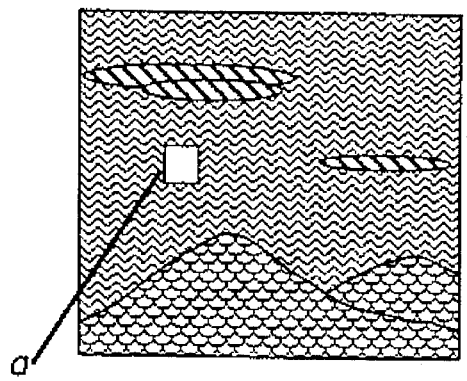
FIG.15E
FIG.15C
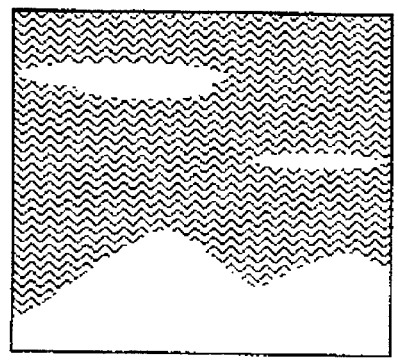
FIG.15D
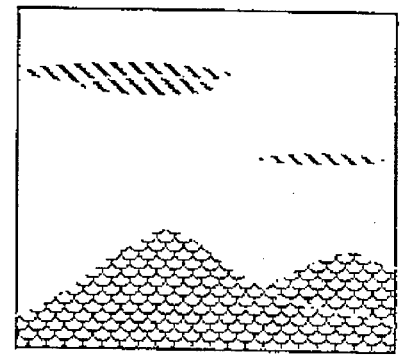
FIG.15F
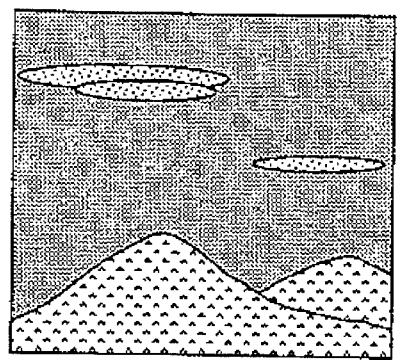

IMAGE FORMING DEVICE MAKING COLOR CORRECTIONS ON STORED IMAGE DATA

BACKGROUND OF THE INVENTION

The present invention relates to an image forming device and, more particularly, to a digital full-color image forming device which is capable of reading and storing original image data, making color corrections on the stored image and producing a color reproduction from the stored image.

The conventional digital full-color copying machine includes the combination of a scanner and a printer, may which be substituted by a printing machine and a monitor. The original image is scanned and a color correction is performed whereby the image is processed with a matrix having the color characteristic of —H reverse to the color characteristic H of the scanner and the printer. The processed colored image is printed out by the printer. The matrix of —H is selected in such a way that the color data O ($\hat{r}$, $\hat{g}$, $\hat{b}$) to be printed out may be the same as those of the original.

The color correction most frequently utilizes a primary matrix and a secondary matrix which are expressed as follows:

$$\left.\begin{array}{l} \hat{r} = K_{01}r + K_{02}g + K_{03}b + Cr \\ \hat{g} = K_{11}r + K_{12}g + K_{13}b + Cg \\ \hat{b} = K_{21}r + K_{22}g + K_{23}b + Cb \end{array}\right\} \quad (1)$$

The expression (1) is a primary color correcting matrix, where r, g and b are color data to be corrected, $K_{01}$, $K_{02}$, $K_{03}$, $K_{11}$, $K_{12}$, $K_{13}$, $K_{21}$, $K_{22}$, $K_{23}$—factors, Cr, Cg, Cb—constants, $\hat{r}$, $\hat{g}$, $\hat{b}$—color data after the color correction.

$$\left.\begin{array}{rcl} \hat{r} & = & K_{01}r + K_{02}g + K_{03}b + K_{04}r^2 + K_{05}g^2 + \\ & & K_{06}b^2 + K_{07}rg + K_{08}gb + K_{09}br + Cr \\ \hat{g} & = & K_{11}r + K_{12}g + K_{13}b + K_{14}r^2 + K_{15}g^2 + \\ & & K_{16}b^2 + K_{17}rg + K_{18}gb + K_{19}br + Cg \\ \hat{b} & = & K_{21}r + K_{22}g + K_{23}b + K_{24}r^2 + K_{25}g^2 + \\ & & K_{26}b^2 + K_{27}rg + K_{28}gb + K_{29}br + Cb \end{array}\right\} \quad (2)$$

The expression (2) is a primary color correcting matrix, where r, g and b are color data to be corrected, $K_{01}$, $K_{02}$, $K_{03}$, $K_{04}$, $K_{05}$, $K_{06}$, $K_{07}$, $K_{08}$, $K_{09}$, $K_{11}$, $K_{12}$, $K_{13}$ ... $K_{29}$—factors, Cr, Cg, Cb—constants, $\hat{r}$, $\hat{g}$, $\hat{b}$—color data after the color correction.

In the final adjustment of the full-color digital copying machines to be shipped from the manufacturer, the color correction has been made by adjusting the above-mentioned factors and constants to the values at which a minimal color difference exists between an original and a copy. Such values have usually been determined by multiple-regression analysis or a like method.

Multiple-regression analysis is one of the methods which derive a regression equation explaining dependent variables through the means of a plurality of independent variables using the method of least squares. It can be performed as follows:

To decrease the factors and constants of a secondary color correction for $$\hat{r} = K_{01}r + K_{02}g + K_{03}b + K_{04}r^2 + K_{05}g^2 + K_{06}b^2 + K_{07}rg + K_{08}gb + K_{09}br + Cr,$$

let us minimize the following equation as to $K_{01}$, $K_{02}$, $K_{03}$, $K_{04}$, $K_5$, $K_{06}$, $K_{07}$, $K_{08}$, $K_{09}$ and Cr:

$$Q(K_{01}, K_{02}, K_{03}, K_{04}, K_{05}, K_{06}, K_{07}, K_{08}, K_{09}, Cr) = \quad (3)$$

$$\Sigma \{Y(j) - (K_{01}r(j) + K_{02}r(j) + K_{03}r(j) + \ldots + K_{09}br(j) + Cr)\}^2$$

Where Y(j) represents a variable in the order of J.

The minimization of the above-mentioned equation (3) means to minimize a total of the differences between the right side and the left side of the expression (2) for R determined as to every sample color Y(j), i.e., to minimize an error.

The determination of the factors and the constants by the above-mentioned multiple-regression analysis can be made in practice as follows:

A standard pattern including a variety of colors is first generated and then printed out. A printed standard pattern is input, by the use of a scanner, into the color correction unit which calculates the factors and the constants in the equation (1) or (2) by a multiple-regression analysis. The equation (2) or a higher degree equation may be considered for application in principle, but the equation (1) is mostly used to obtain printing speed and a circuit scale of the device. The determination of the factors and constants may be done, not in real time, but the practice requires real-time processing with the equation (1) or (2).

The original image is input by the scanner into the color correction unit wherein the input image is processed with a matrix —H inverse to the color characteristic H of the scanner and the printer. Thus, the processed image is printed out. The color difference between the original and its copy can be minimized by multiple-regression analysis and the equation (1) or (2) to find the inverse matrix —H so that the color O ($\hat{r}$, $\hat{g}$, $\hat{b}$), to be printed out, may coincide with the original color.

Among a variety of colors, flesh-color, sward's-green and sky-blue are very familiar to us in our daily life. Therefore, in color printing, it is very important to reproduce finely these specific colors.

The following is described in a paper "Development of a color reproduction theory in hard copying", Y. MIYAKE, Journal of Electrophotography, Vol. 29, No. 3, 1990. P284–292.

In color correcting, the flesh-color area of an original copy is first extracted and the area of a face is then extracted therefrom through a process such as removing separate points, expanding, contracting, labeling and recognizing the shape. The extracted face area is corrected with a color correcting factor which assures a fine reproduction of the flesh color and the rest is corrected by a normal color correcting factor. A correcting matrix for flesh-color includes a variety of flesh-color patterns processed by multiple regression analysis in order to minimize the difference in the color between an original and a print's sample. Therefore, it can assure a fine correction of the flesh-color. However, this matrix cannot be applicable for correcting any color other than flesh-color. Accordingly, color correction is effectively done by applying the specially prepared matrix to the flesh-color area only and by applying a standard matrix to the other normal colored areas.

Original image data is input by a scanner into a color correction unit which extracts each color area of the original image from the data input therein and separately selects a suitable color correction matrix for each extracted area, e.g., a flesh-color correcting matrix for a flesh-color area and a sky-blue correcting matrix for a sky-blue area. This makes it possible to finely correct specific colors requiring precise reproduction for the human eye by selectively using corresponding matrices especially prepared for them and to limit the correction effect to only an extracted area with no effect on the rest of the areas.

Three color correcting blocks A, B and C perform color correction, respectively, with a flesh-color correcting matrix, a sky-blue color correcting matrix and a normal color correcting matrix made from a wide range of color samples. The flesh colored area and the sky blue area are separately extracted and corrected by using the color correcting matrices A (for the flesh-color area) and B (for the sky-blue color area) respectively. In the case of an example of a color image original, image data of the upper sky-blue area is corrected by the use of the color correcting matrix B, image data of the flesh-color areas of a face and hands is corrected by the use of the color correcting matrix A and image data of the remaining normal colored areas is corrected by the use of the color correcting matrix C.

A conventional type digital, full-color copying machine comprises an original photographic image, an image sensor comprising a charge coupled device (CCD), an A-D converter, a shading correction, a color converter, a portion for UCR (Under Color Removal) and BP (Black Paint) memory and laser unit.

The CCD image sensor reads by scanning the original image and transfers the image data "r", "g" and "b" (sampling) to the A-D converter which in turn converts the analog image data into digital signals R, G, B (quantized). These digital signals, which include an error induced by variations of the CCD elements and the uneven luminosity of a lamp, are corrected in the shading correction portion and then transferred to the color converter which in turn converts the digital image signals into those having a gray level suitable for the visual properties of the human eye by logarithmic conversion and converting three primary colors (R, G, B) of light into three primary colors (Y, M, C) of the toner. The UCR and BP portions perform under color removal from the converted data and by black painting thereon and then enter the processed data into the memory. When copying is required, the digital image data is subsequently read out from the memory and transferred to the laser unit which outputs a full-color image.

The Japanese publications of unexamined applications JP,A, 60-91770 and JP,A, 4-323957 describe, respectively, a color image processing device and a color image processing method, which are the prior art devices and methods which the present invention is concerned with. These prior art references involve extracting an area of a specific color from an original specimen to include even a small amount of a specific color, e.g., flesh color and conducting special processing such as fuzzy optimal processing. This may prolong the process and/or increase its performance cost in view of the fact that most of the originals have a small area of the specific color and may not be effectively processed for an increased time of the special processing. On the contrary, the present invention proposes to determine an area of a specific color of an original image and to conduct a masking process on the original color data only when the determined area of the specific color is large or to conduct normal masking of the original image if the determined area is small, thereby making it possible to quickly correct most of the normal color originals and to highly correct any original image that is rich with the specific color to get an image of high quality. This may improve the performance cost of the color image processing device.

FIG. 1 shows the principle scheme of a conventional digital full-color copying machine. The shown case includes a combination of a scanner and a printer, which, however, may be substituted by a combination of a printing machine and a monitor. An original image is scanned by the scanner to put in a color correction (step 1) wherein the image is processed with a matrix having a color characteristic of —H reversed to a color characteristic H of the scanner and the printer (step 2). The processed color image is printed out by the printer (step 3). The matrix of —H is selected in such a way that the color data O (r̂, ĝ, b̂) to be printed out may be the same as those of the original.

As shown in FIG. 1, an original image is input by the scanner into the color correction unit wherein the input image is processed with a matrix —H, inverse to the color characteristic H, of the scanner and the printer. Thus the processed image is printed out. A color difference between the original and its copy can be minimized by multiple-regression analysis and the equation (1) or (2) to find the inverse matrix —H for making that the color O (r̂, ĝ, b̂) to be printed out to coincide with the original color.

FIG. 2 is a view showing the system of a conventional digital, full-color copying machine.

Original image data is input by a scanner into a color correcting matrix (step 1) which extracts every color area of the original image from the data input therein (step 2) and separately selects a suitable color correcting matrix for each extracted area (step 3), and the color image is printed out by the printer (step 4), e.g., a flesh-color correcting matrix for a flesh-color area and a sky-blue correcting matrix for a sky-blue area. This makes it possible to finely correct specific colors requiring the precise reproduction for the human eye by selectively using corresponding matrices especially prepared for them and to limit the correction effect to only an extracted area with no effect on the rest of the areas.

In FIG. 2, there are shown three color correcting blocks, A, B and C which perform color corrections, respectively, with a flesh-color correcting matrix, a sky blue-color correcting matrix and a normal color correcting matrix made from a wide range of color samples.

The flesh-color and sky-blue color areas are separately extracted and corrected by using the color correcting matrices A (for the flesh-color area) and B (for the sky-blue color area) respectively. In the case of an example of a color image original shown in FIG. 3, image data of the upper sky-blue area is corrected by the use of the color correcting matrix B, image data of the flesh-color areas of a face and hands are corrected by the use of the color correcting matrix A and image data of the rest of the normal colored areas are corrected by the use of the color correcting matrix c (see FIG. 2).

FIG. 4 is a construction block-diagram of a conventional type digital full-color copying machine, wherein numeral 1 designates a photographic (image) original, and which comprises an image sensor 2 comprising a charge coupled device (CCD), an A-D converter 3, a shading correction 4, a color converter 5, a portion for UCR (Under Color Removal) and BP (Black Paint) 6, a memory 7 and a laser unit 8.

The CCD image sensor 2 reads by scanning the original image 1 (step a) and transfers the image data "r", "g" and "b" (sampling) to the A-D converter 3 (step b) which in turn converts the analog image data into digital signals R, G, B (quantized). These digital signals, which include an error induced by variations of CCD elements and the uneven luminosity of a lamp, are corrected in the shading correction unit 4 and then transferred to the color converter 5 (step c) which in turn converts the digital image signals into those having a gray level suitable for the visual property of the human eye by use of logarithmic conversion and converts three primary colors (R, G, B) of light into three primary colors (Y, M, C) of toner. The UCR and BP portion 6 performs under-color removal from the converted data and black painting thereon and then enters the processed data into the memory 7. When copying is required, the digital image data is subsequently read out from the memory 7 (step d) and transferred to the laser unit 8 which outputs a full-color image.

As mentioned above, the conventional image forming device employs an advanced system that extracts a flesh-color area and a sky-blue area and separately corrects the extracted areas by using specially selected correction values in a correction table in order to match them with the visual properties of the human eye. This device, however, has a drawback that, if the device is used for color correction in a full-color digital copying system with a full-color digital scanner, it requires much time for processing and reduces the speed of color correction. An attempt to increase the processing speed of the device has led to its increased size with an increase in cost to manufacture because the color area extraction contains many operations such as removing separate points, expanding and contracting, labeling and so on. The problem is that any area of specific color, e.g., flesh-color must be extracted even if the original has only a small area of said color. In other words, the device always performs the extraction of the specified color areas on any kind of originals, e.g., an original mostly containing characters and having no need of the above-mentioned operations. In this case, the time is consumed with no effect on printing quality. The separate correction of an extracted area of any specified color, e.g., flesh-color, by using a factor selected for masking the color is effective to improve the color reproduction's quality but it makes the device expensive and time-consuming. This is the reason the device has not heretofore been employed in practical applications.

In a digital full-color copying machine, a full-color image copy to be output has several specified colors, e.g., human flesh-color and sky-blue, which must be faithfully reproduced. The specific colors are familiar to us in our daily life and, therefore, are easily recognized by the human eye. However, the conventional digital full color copier performs one-patterned color correction and offers poor reproduction of the specific colors. It cannot provide a full-color image with finely reproduced flesh-color and sky-blue color therein. This may totally effect the quality of the copy products of a the digital copying machine.

SUMMARY OF THE INVENTION

It is an object of the present invention to provide a color correcting device for use in a full-color copying system with color masking, which is capable of determining areas of specific colors (e.g. flesh-color, sky-blue) determined during the time of pre-scanning an original image; selectively uses a plurality of correction matrices for correcting colors (flesh-color, sky-blue and normal colors) at the time of color masking, depending on whether the specific color area is larger than the specific value or not; dynamically switches the color correcting matrices according to pixels' colors; characterized by excellent color reproduction of the original that can be obtained and capable of high speed printing of the original having small amounts of the specific color.

It is another object of the present invention to provide the possibility of correcting image data of specific colors (easily recognizable by human eye but not easily reproducible by the full-color copying machine) by using respective correction tables prepared on the basis of data obtained by measuring a number of samples; to correct image data other than the specified colors by using a normal correction table (to make the color be similar to the original one); to extract only the specific color when the user designates it (the conventional method employs the time-consuming automatic extraction of all colors); to effectively perform the color correction in a shorter time.

It is another object of the present invention to obtain an output image that satisfies the user's requirements by providing the possibility of freely selecting the necessity to correct the image's color in order to remove the drawback of the conventional method that provides only automated color correction, not allowing the user to select a desired color (some users desire the correct reproduction of the original color, as for example, in the case where an automatically corrected image of a human figure represents somewhat colored skin while the original represents white skin).

The present invention has as its primary object to provide a color image forming device for use in a digital full-color copying system, which is capable of more precisely correcting such colors, e.g., flesh-color, garden-green, sky-blue, all of which are familiar to us in daily life and therefore require high quality color reproduction using the actual colors of the original, and which is also capable of high-speed color correction for most of the usual originals, e.g., of character images, which do not require high-quality color reproduction but only economical high speed printing. According to the present invention, it is possible to get a print sample of high quality color reproduction from an original image being rich with specific colors, e.g. flesh-color, garden-green, sky-blue and so on, by determining an area of each specific color at the time of pre-scanning the original and by separately extracting and correcting each specific colored area if the area is large, and it is also possible to quickly get a printing sample from the original image including a small amount of any specific color. The device according to the present invention can automatically detect, at the time of pre-scanning, whether an original image is requiring the separate correction of any specific color or not. There is no need to worry about the decision for separate color correction. Pre-scanning is conducted to detect the size, position and monochrome or color state of an original without determining any specific color area, i.e., with no loss of pre-scanning speed. It is also possible to determine an area of specific color on an original at a reduced speed (cost) by thinning the image data.

The present invention proposes to prepare a plurality of specific color correcting tables (for flesh-color, sky-blue and so on), each containing image data obtained from measurements of image samples of only a specific color (e.g. flesh-color or sky-blue); selectively extracting any desired area of any specific color on a full-color original image; and of performing color correction with color masking of the extracted area according to the designated color correction table and of not-extracted areas according to a table for normal color correction. This feature is effective to provide a full-color copy image of a desired color quality and to improve the image quality of a digital full-color copying machine.

Looking at a monitor screen, one can carry out the above-mentioned color correcting operations. This makes it possible to reduce the circuity of the device in comparison with the circuity of a device which performs automatic area separation. Accordingly, the device may be manufactured at lower cost and may work at higher speed (without extracting a specific color area, e.g., from an image of a person wearing a flesh-colored or sky-blue suit which would be extracted when automatic area separation is performed).

BRIEF DESCRIPTION OF DRAWINGS

FIGS. 15A, 15B, 15C, 15D, 15E, 15F are a view for explaining how to designate a specific color according to the present invention.

PREFERRED EMBODIMENT OF THE INVENTION

Figure 1:
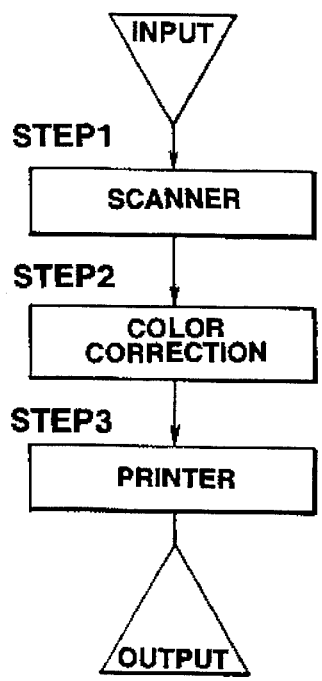
FIG. 1 is a view showing a system of a conventional digital color copier.

FIG. 1 shows the principle scheme of a conventional digital full-color copying machine. The shown case includes a combination of a scanner and a printer, which, however, may be substituted by a combination of a printing machine and a monitor. An original image is scanned by the scanner to put in a color correction (step 1) wherein the image is processed with a matrix having a color characteristic of —H reversed to a color characteristic H of the scanner and the printer (step 2). The processed color image is printed out by the printer (step 3). The matrix of —H is selected in such a way that the color data O ($\hat{r}$, $\hat{g}$, $\hat{b}$) to be printed out may be the same as those of the original.

As shown in FIG. 1, an original image is input by the scanner into the color correction wherein the input image is processed with a matrix —H, inverse to the color characteristic H, of the scanner and the printer. Thus the processed image is printed out. A color difference between the original and its copy can be minimized by multiple-regression analysis and the equation (1) or (2) to find the inverse matrix —H for making that the color O ($\hat{r}$, $\hat{g}$, $\hat{b}$) to be printed out to coincide with the original color.

Figure 2:
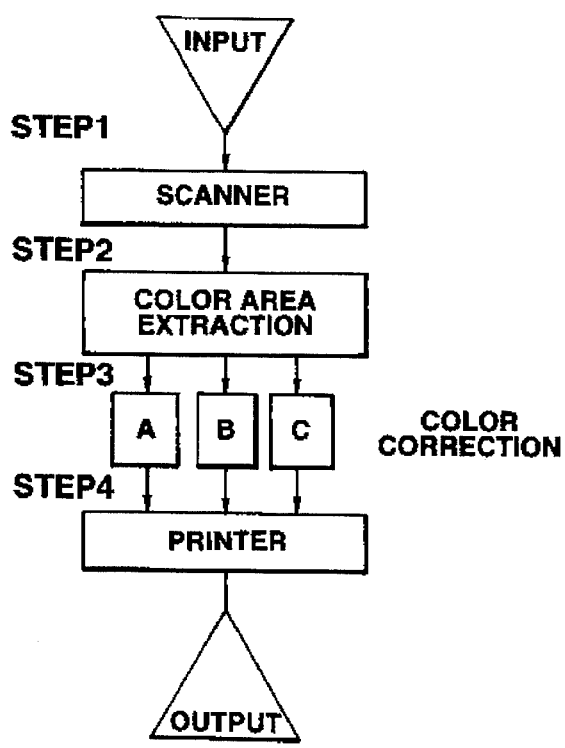
FIG. 2 is a view showing another system of a conventional digital color copier.

FIG. 2 is a view showing the system of a conventional digital, full-color copying machine.

Original image data is input by a scanner into a color correcting matrix (step 1) which extracts every color area of the original image from the data putt therein (step 2) and separately selects a suitable color correcting matrix for each extracted are (step 3), and the color image is printed out by the printer (step 4), e.g., a flesh-color correcting matrix for a flesh-color area and a sky-blue correcting matrix for a sky-blue area. This makes it possible to finely correct specific colors requiring the precise reproduction for the human eye by selectively using corresponding matrices especially prepared for them and to limit the correction effect to only an extracted area with no effect on the rest of the areas.

In FIG. 2, there are shown three color correcting blocks, A, B and C which perform color corrections, respectively, with a flesh-color correcting matrix, a sky blue-color correcting matrix and a normal color correcting matrix made from a wide range of color samples.

Figure 3:
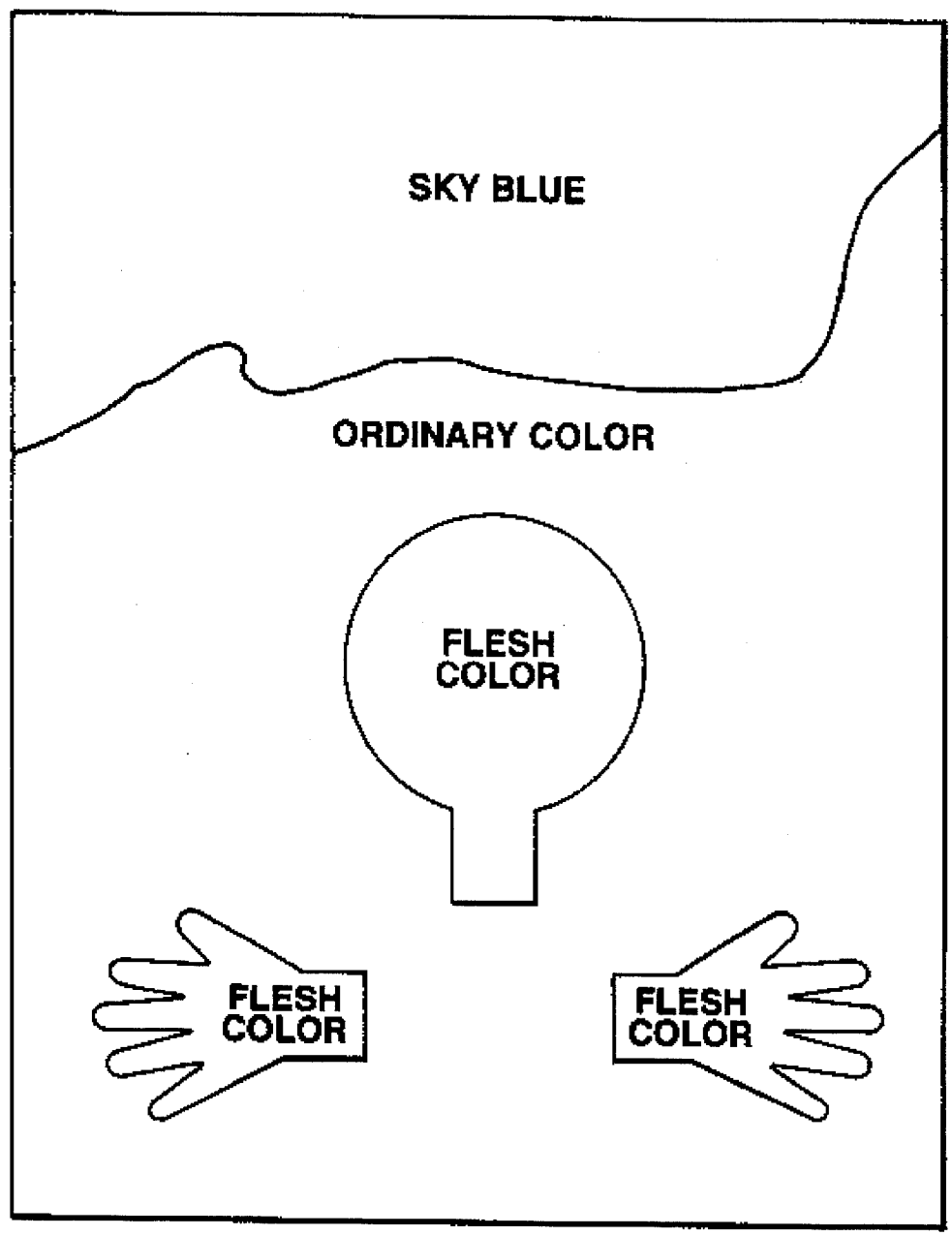
FIG. 3 is a view showing a conventional color correction.

The flesh-color and sky-blue color areas are separately extracted and corrected by using the color correcting matrices A (for the flesh-color area) and B (for the sky-blue color area) respectively. In the case of an example of a color image original shown in FIG. 3, image data of the upper sky-blue area is corrected by the use of the color correcting matrix B, image data of the flesh-color areas of a face and hands are corrected by the use of the color correcting matrix A and image data of the rest of the normal colored areas are corrected by the use of the color correcting matrix C (see FIG. 2).

Figure 4:
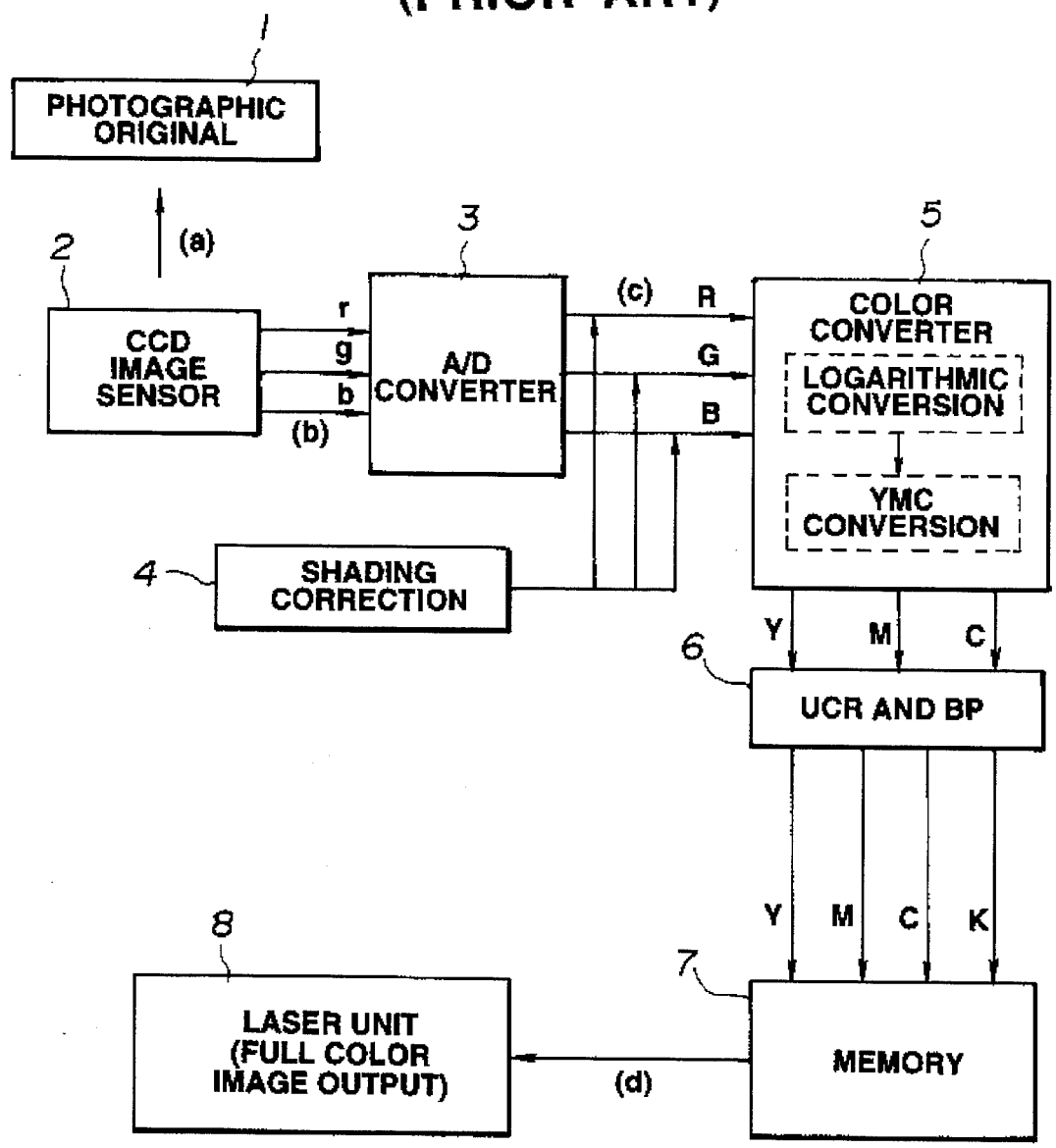
FIG. 4 is a construction view of a conventional digital color copier.

FIG. 4 is a construction block-diagram of a conventional type digital full-color copying machine, wherein numeral 1 designates a photographic (image) original, and which comprises an image sensor 2 comprising a charge coupled device (CCD), an A-D converter 3, a shading correction 4, a color converter 5, a portion for UCR (Under Color Removal) and BP (Black Paint) 6, a memory 7 and a laser unit 8.

The CCD image sensor 2 reads by scanning the original image 1 (step a) and transfers the image data "r", "g" and "b" (sampling) to the A-D converter 3 (step b) which in turn converts the analog image data into digital signals R, G, B (quantized). These digital signals, which include an error induced by variations of CCD elements and the uneven luminosity of a lamp, are corrected in the shading correction 4 and then transferred to the color converter 5 (step c) which in turn converts the digital image signals into those having a gray level suitable for the visual property of the human eye by use of logarithmic conversion and converts three primary colors (R, G, B) of light into three primary colors (Y, M, C) of toner. The UCR and BP portion 6 performs under-color removal from the converted data and black painting thereon and then enters the process data into the memory 7. When copying is required, the digital image data is subsequently read out from the memory 7 (step d) and transferred to the laser unit 8 which outputs a full-color image.

Figure 5:
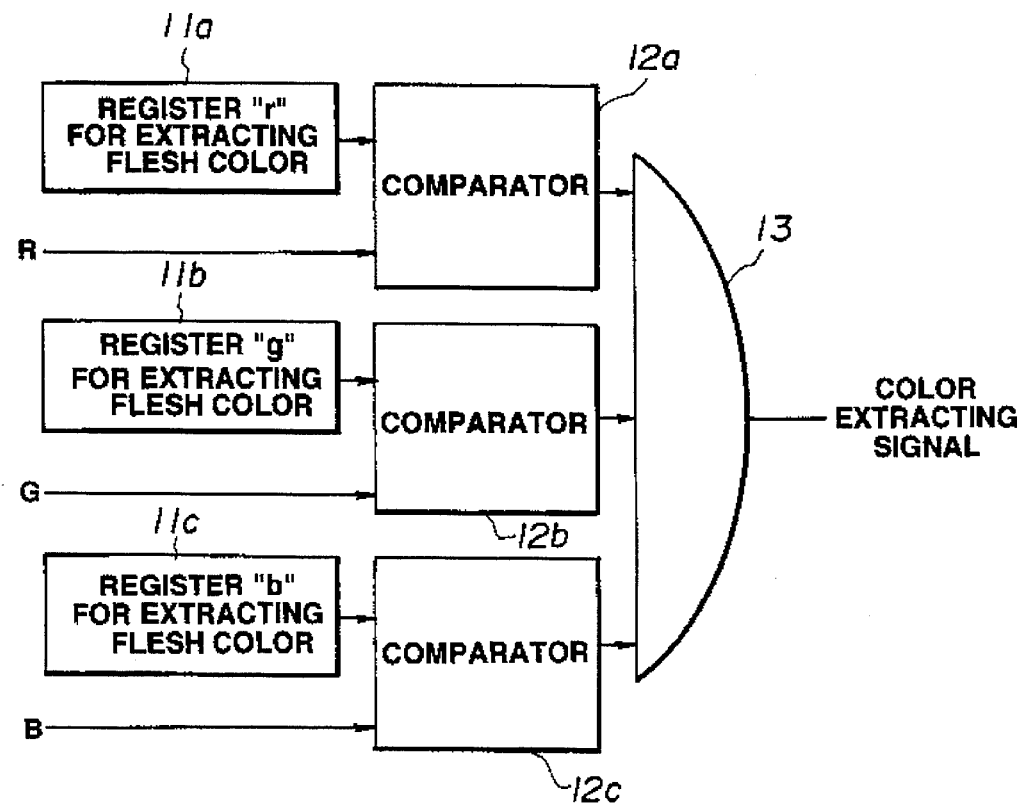
FIG. 5 is a block diagram for explaining an example of a circuit for extracting a specific color for use in an image forming device according to the present invention.

Referring now to the accompanying drawings, preferred embodiments of the present invention will be described in detail as follows:

FIG. 5 is a construction view for explaining an example of a circuit for extracting a specific color area on an original image in an image forming device embodied in the present invention. The circuit comprises a register 11a for extracting flesh-color (r), a register 11b for extracting flesh-color (g), a register 11c for extracting flesh-color (b), comparators 12a, 12b, 12c and an AND-circuit 13.

The circuit first performs pre-scanning of an original image to extract a specific color, e.g., flesh-color therefrom. The specific color extraction can be made by a simple circuit which, by way of example, comprises three flesh-color extracting registers r, g and b which preset thereat extractable primary color components, red, green and blue, and of flesh-color respectively. The comparators 12a, 12b and 12c compare components R, G and B of the image data, respectively, with the registers r, g and b. They have an output "1" only if their inputs are $r-C_0<R<r+C_1$, $g-C_2<G<g+C_3$ and $b-C_4<B<b+C_5$ respectively. The AND-circuit 13 with three inputs has an output "1" only if its inputs are $r-C_0<R<r+C_1$, $g-C_2<G<g+C_3$ and $b-C_4<B<b+C_5$ simultaneously. $C_0-C_5$ are constants which are defined depending upon a color range of color data used for determining matrix factors (coefficients) used for correcting the flesh-color. This means that the image data with flesh-color extracted by a scanner can be corrected with the use of matrix factors for flesh-color correction of a finely reproduced color.

Figure 6:
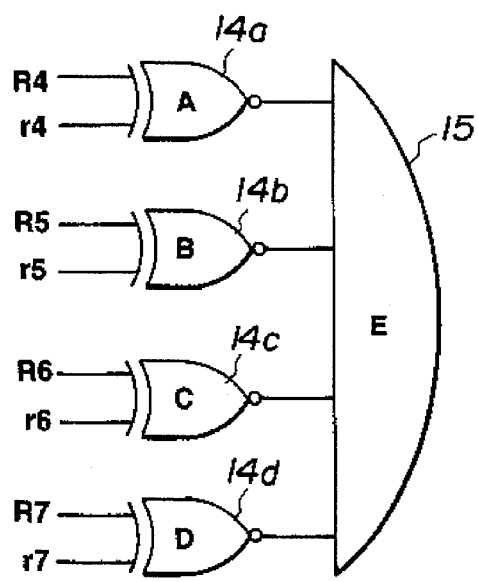
FIG. 6 shows an example of a circuit of a comparator shown in FIG. 5.

FIG. 6 shows an example of a circuit of the comparator shown in FIG. 5. The comparator includes EXNOR-circuits (A,B,C,D) 14a,14b,14c,14d and AND-circuit 15.

The comparator can also be formed of simple circuity. For example, if $r-C_0<R<r+C_1$ is 38H with C0=9H and C1=8H, there will be 2FH<R<40H that means the necessity of extracting pixels having R-values from 30H to 3FH can easily be achieved by using 4 EXNOR 14a,14b,14c,14d and the AND-circuit 15 with four inputs. When an image data has 8 bits, the most significant bit $R_7$ of its components R of the image data and the most significant bit $r_7$ of the flesh-color extracting register r are input into the EXNOR-circuit (D) 14d whose output is "1" only if $R_7=r_7$. The 6th bit, 5th bit and 4th bit of the image data and those of the registers are put into the respective EXNOR-circuits (C),(B),(A) which output is "1" only if the components R of the image data are equal to the respective values preset at the registers r.

Outputs of the EXNOR-circuits 14a,14b,14c,14d are input into the AND-circuit (E) 15 whose output is "1" only if all inputs are "1", i.e., 4 sets of input bits are equal to each other. In the shown case, if $r_4=r_5=1$ and $r_6=r_7=0$ are preset and 4 left significant bits is 3H, the AND-circuit (E) 15 with four inputs has an output "1". The embodiment is realized since the output of the comparator is "1" only in the case of 2FH<R<40H. Accordingly, when three comparators for components R, G, B prepared for fresh-color are connected at their outputs to an AND-circuit with three inputs as shown in FIG. 5, the AND-circuit has an output "1" (color extraction signal) only in the case of the image data relating to "flesh-color".

Figure 7:
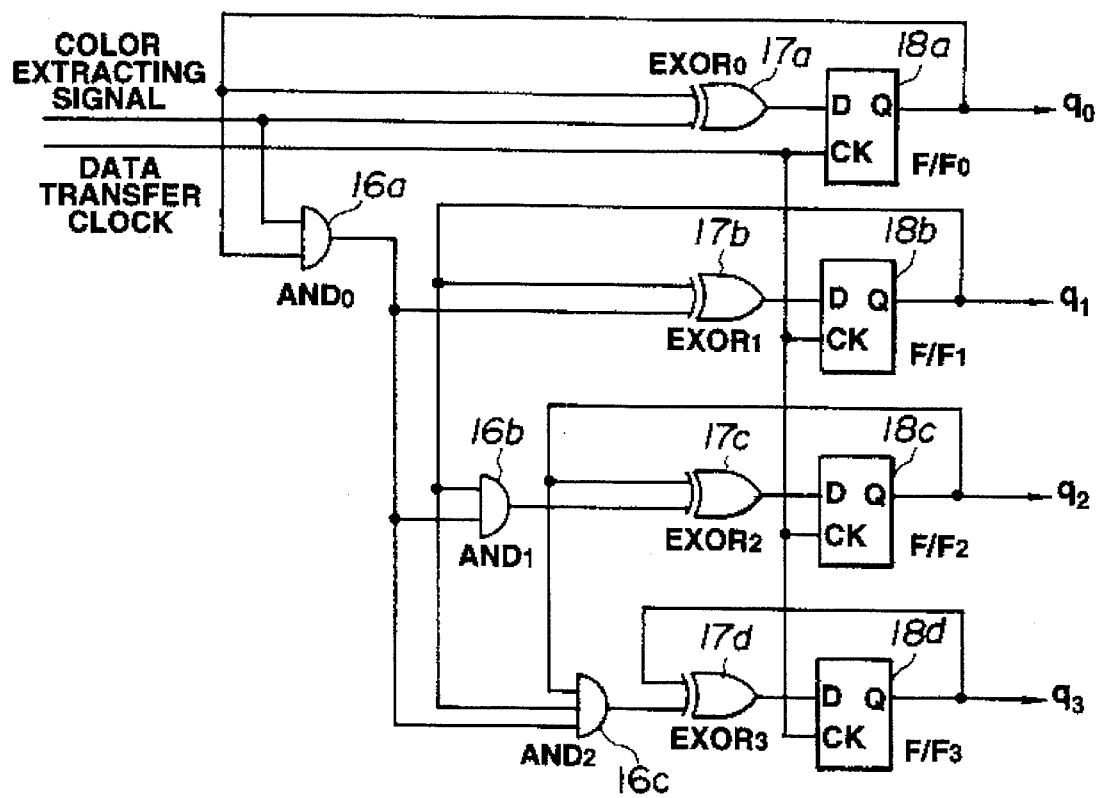
FIG. 7 shows an example of a circuit for determining an area of a specific color, according to the present invention.

FIG. 7 shows an example of a circuit for determining an area of a specific color according to the present invention, which includes AND-circuits 16a,16b,16c, EXOR-circuits 17a,17b,17c,17d and flip-flops 18a,18b,18c,18d.

An area of specified color on an original image, which is extracted by the specified color extracting circuit shown in FIG. 5, can be determined by counting pixels (pictorial elements) included therein. This circuit is simple and easily formed.

For example, a 4 bit counter is composed of 4 flip-flops 18a,18b,18c,18d, 4 EXOR-circuits 17a,17b,17c,17d, 2 AND-circuits 16a, 16b with two inputs and 1 AND-circuit 16c with three inputs. The above-mentioned color-extraction signal is input into the EXOR-circuit ($EXOR_0$) 17a which at its other input receives an output signal $q_0$ from the flip-flop F/F0. If one input is "1", the EXOR-circuit inverts the level of its output for the level of the other input. This output is applied to a data input of the Flip-flop F/F0 which, therefore, inverts the level of its output in synchronism with a data transfer clock only when the color extraction signal is "1". As a usual binary counter, output signals $q_0$ and $q_1$ of the flip-flops F/F0 and F/F1 are applied to the inputs of the EXOR-circuit ($EXOR_1$) 17b, but, unlike the usual binary counter, the output of the AND-circuit ($AND_0$) 16a is "1" only if the color extraction signal and the signal $q_0$ are all "1". In this case, the output of the flip-flop F/F1 is inverted in synchronism with the data transfer clock. The flip-flops F/F2 and F/F3 convert their data-outputs when a lower-order bit is "1" and the color extraction signal is "1". Accordingly, counting occurs only when the color extraction signal is "1". It is also possible to reduce the number of bits for the counter and to give a margin of counting speed by thinning pulses of data transferring clock relative to the practical image data. The area of any specific color can be easily counted by the above-described circuit.

Figure 8:
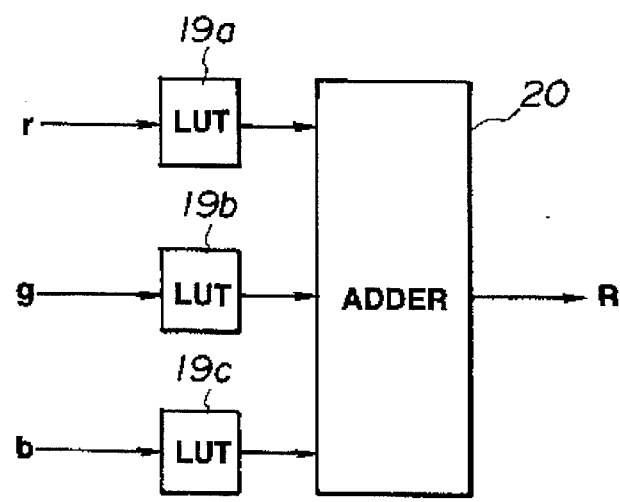
FIG. 8 shows a color correcting circuit, according to the present invention.
Figure 9:
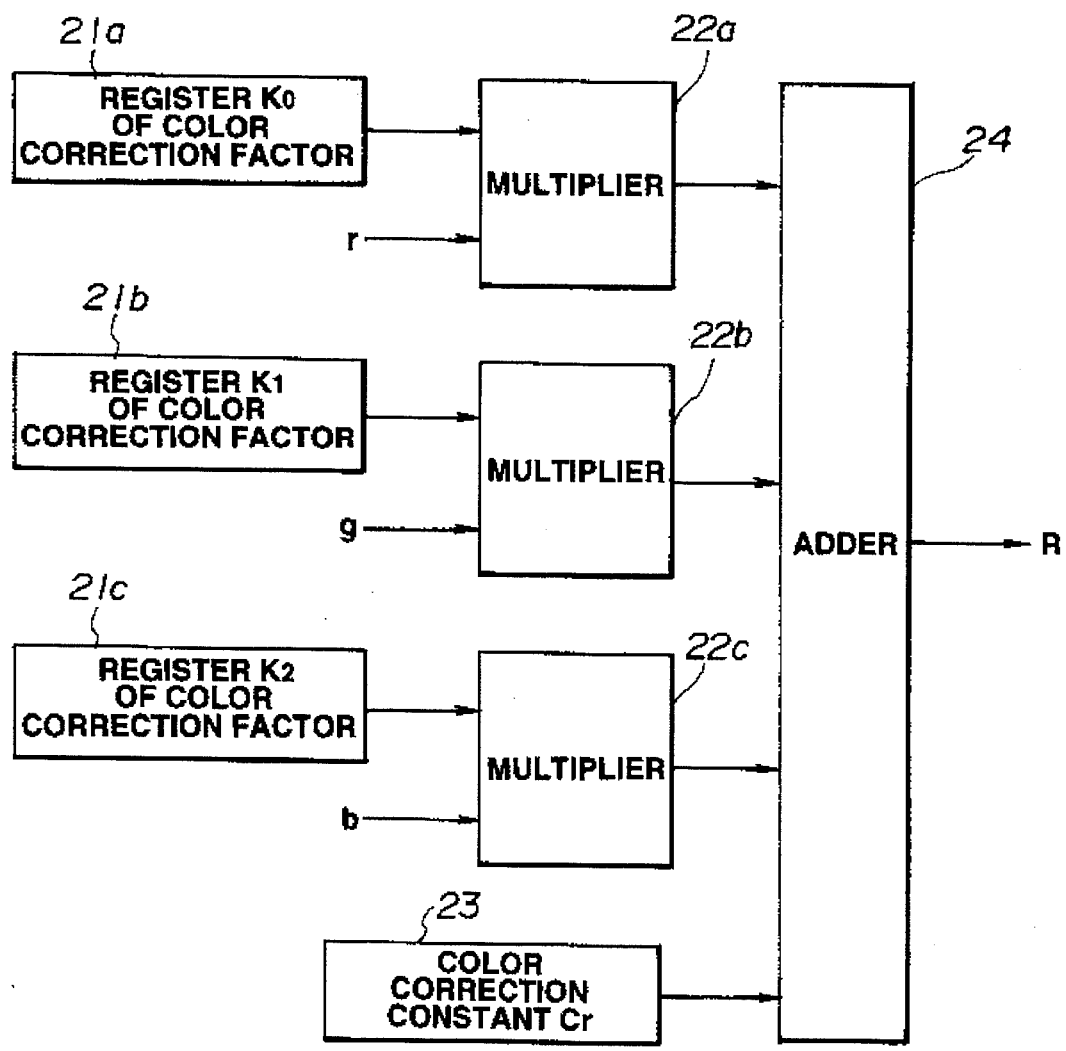
FIG. 9 shows another example of a color correcting circuit, according to the present invention.

FIGS. 8 and 9 show examples of color correcting circuits according to the present invention. There are shown look-up tables (LUT) 19a,19b,19c, an adder 20, registers of color correction factors 21a,21b,21c, multipliers 22a,22b,22c, a color correction constant 23 and an adder 24.

A determined area of extracted specific color is compared with a specific value. If the area is smaller than the specific value, the normal color correction is carried out as described with reference to FIG. 1. This is achieved by color masking according to color correcting factors previously determined by multiple-regression analysis. For example, a primary color masking for correcting red color data is conducted by using the look-up tables LUT and the 3-input/1-output adder shown in FIG. 8, or the correcting operation $R=k_0r+k_1g+k_2b+Cr$ is carried out by the system comprising the correction factor registers $k_0,k_1,k_2$, correction constant register Cr, multipliers 22a,22b,22c and adder 24 (FIG. 9). The original having a small amount of the specified colors can be processed at a high speed.

Figure 10:
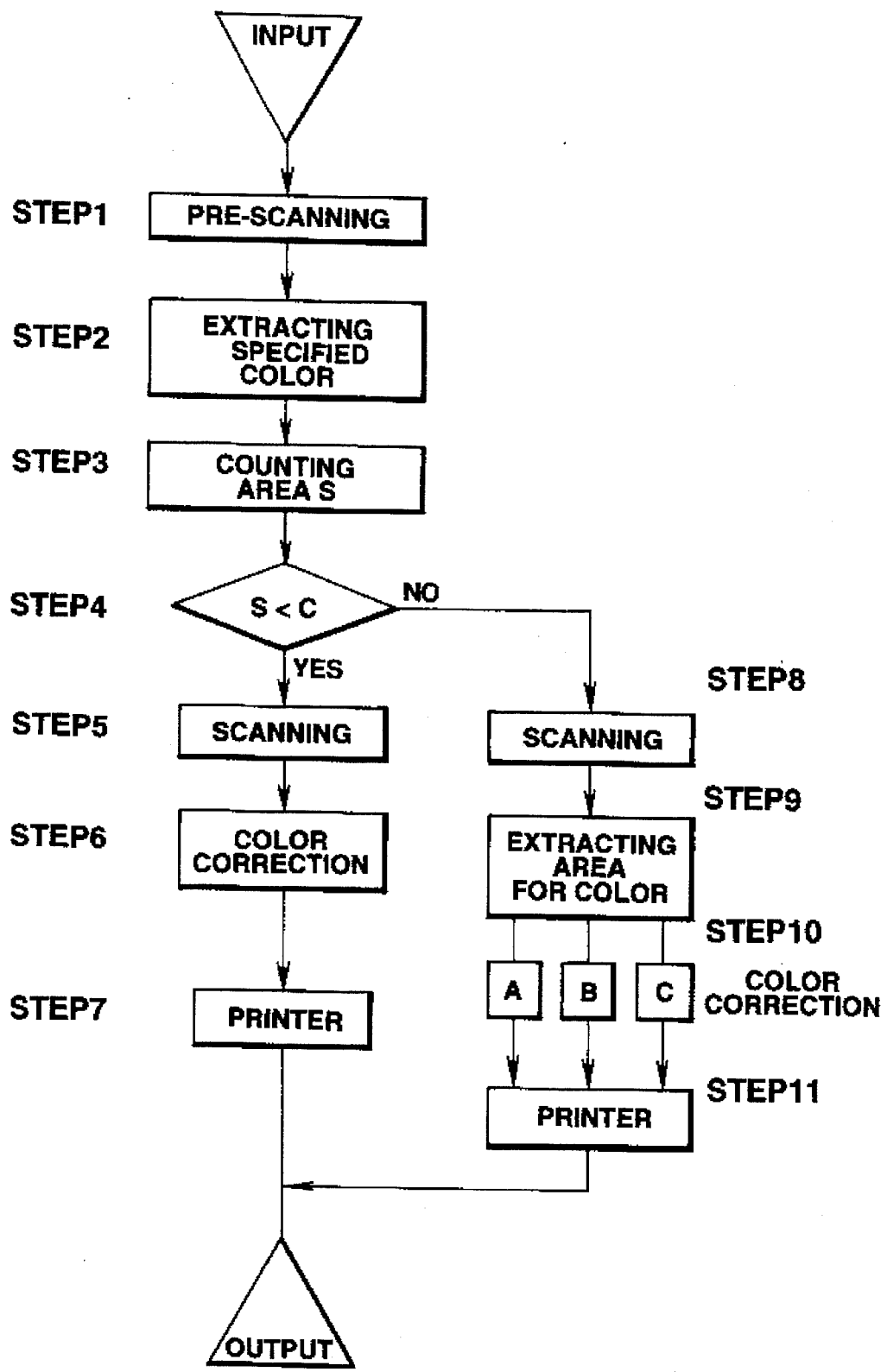
FIG. 10 is a flow chart for explaining the operations of an image forming device, according to the present invention.

Referring now to FIG. 10 showing an operation flow chart of an image forming device according to the present invention, the operation of the device will be explained in order of the shown steps as follows:

First, the original image is pre-scanned (step 1) and each specific color, e.g., flesh-color, is extracted (step 2) by the specific color extraction unit shown in FIG. 6. The area S of the extracted specific color is determined by counting pixels (pictorial elements) included therein (step 3) by the circuit shown in FIG. 7.

The determined area S of the specific color is compared with a specific value C (step 4). If the area S is smaller than the value C, the normal color correction is conducted as described referring to FIG. 1 (steps 5 and 6). The color-corrected image data are output to the printer (step 7). In step 4, if the area S is not smaller than the value C, the original image with a large amount of the specific color shall be processed in steps 8–11 as shown in FIG. 2.

Each color area is extracted from the scanned image (steps 8 and 9) and a suitable correction factor is selected and applied to the area (step 10). To increase the accuracy of the color area extraction, it is necessary to perform additional operations such as the removal of separate points, expansion and contraction, labeling and shape recognition. This is a time-consuming process. In case of omitting a shape recognition, it is still necessary to correct the right side pixels more precisely than the left side pixels. This processing also takes time. However, all the processings assure the increased quality of the image color reproduction.

The number of the color correcting tables selectably used for the correction of extracted specific color areas are not limited. In determining the area of specific colors, it is allowable to use a total area of all the specific colors or the maximal value of all the measured areas of the specific colors.

Figure 11:
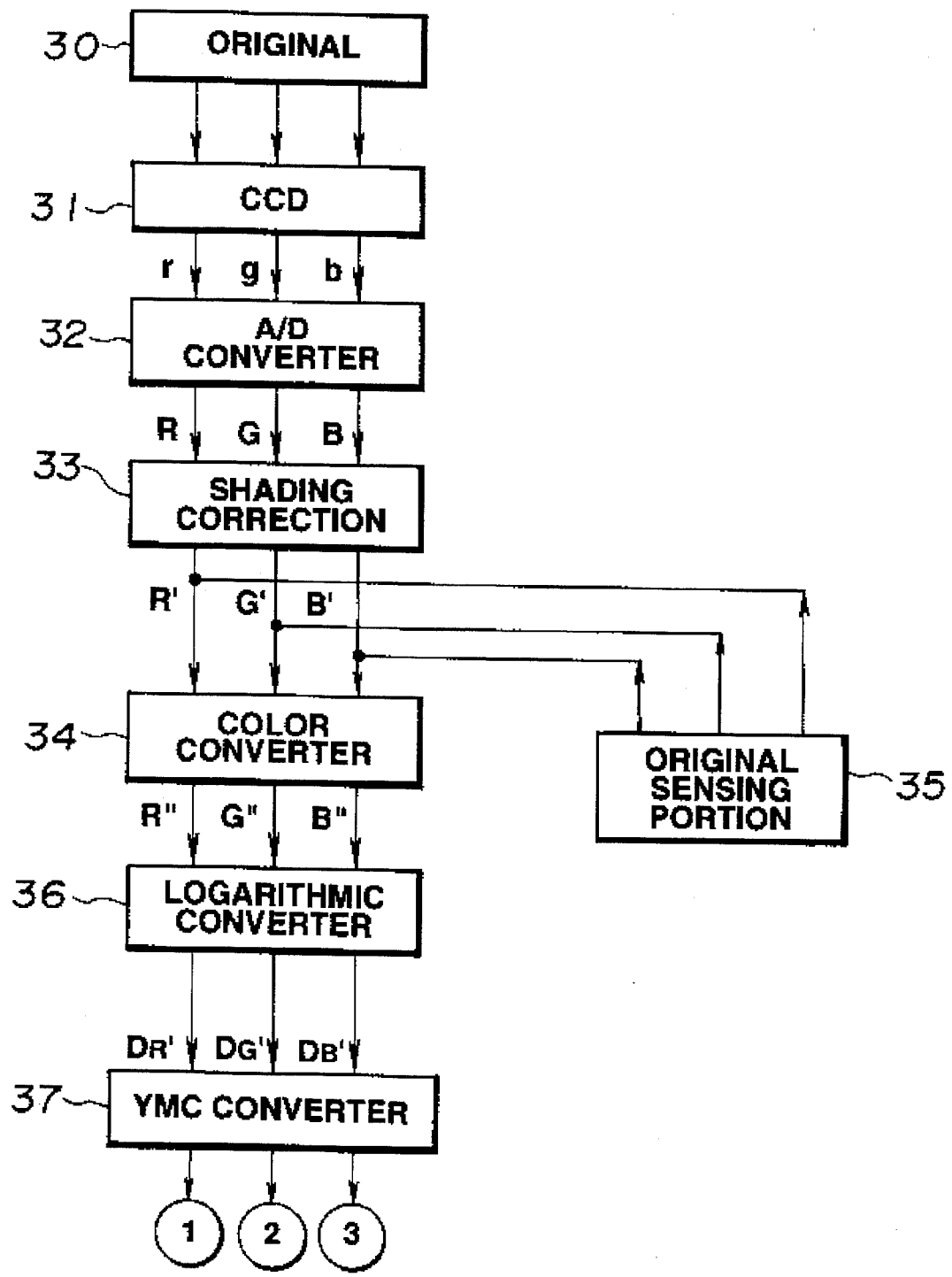
FIGS. 11 and 12 are a block diagram for explaining the structure of a full-color digital copying machine utilizing a color correcting function, according to the present invention.
Figure 12:
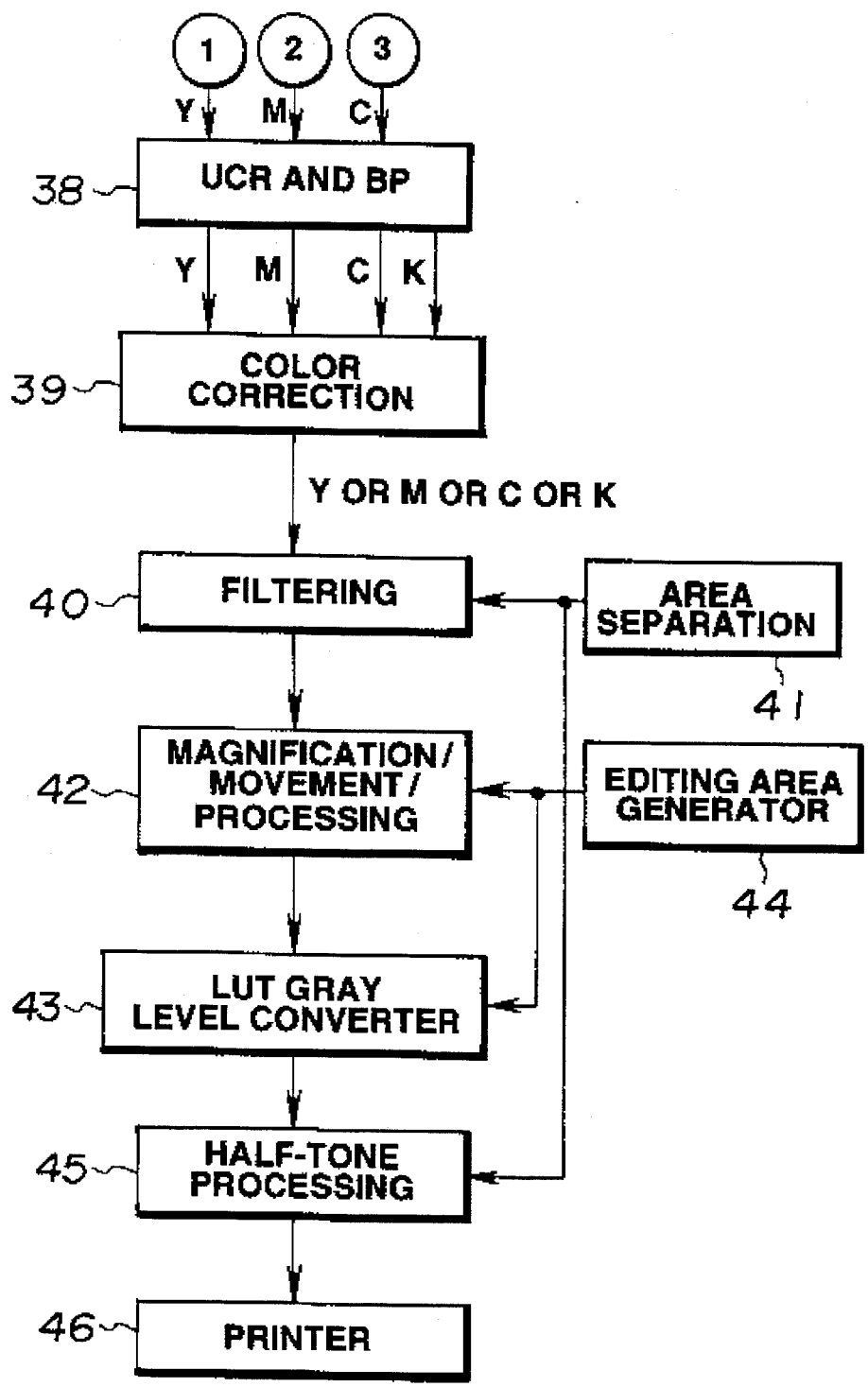

FIGS. 11 and 12 are a construction block diagram of a full color digital copying machine utilizing a color correcting system according to the present invention which includes an original image 30, a CCD (charge coupled device) 31, an A-D converter 32, a shading correction 33, a color converter 34, an original sensing portion 35, a logarithmic converter 36, a YMC converter 37, a UCR (Under-Color Removing) and BP (Black Painting) portion 38, a color correction 39, a filtering portion 40, an area separation 41, a portion for selecting a multiplying factor, moving and processing 42, a LUG (look up table) for gray level conversion 43, an editing area generator 44, a halftone processing portion 45 and a printer 46.

The CCD 31 photoelectrically converts the original image into sampled image data. One image can be taken from a monochrome original by scanning it two times (including 1 pre-scan) and from a color original by scanning it 5 times (including 1 pre-scan and 4 scans of components Y, M, C and K).

The A-D converter 32 converts an analog signal into a digital signal and quantizes it. The number of bits for quantization is defined as 24 bits per pixel (R=8 bits, G=8 bits and B=8 bits). Three output signals of R, G and B are output at the same time. (The A-D converter has three outputs.)

The shading correction 33, corrects the image data for a variation of elements of the CCD 31, differential transmittivity of the lens at its center and periphery, uneven luminosity and degradation of the lamp.

The color converter 34 has the function of converting a designated color (r, g, b) into another one. Not-designated colors are omitted.

The logarithmic converter 36 converts the output signals of the CCD into signals suitable to the visual property of the human eye. This is called a gray level conversion. The output signal of the CCD is linear to the original but is logarithmically felt by the human eye. Accordingly, the signal is damped to a gray level suitable to the human eye through logarithmic correction.

Reflection ratio (O.R) and gray level (O.D):

$$-\log (O.R) = (O.D)$$

The original sensing portion 35 detects the following items of an original during a pre-scanning (preliminary scanning before scanning the original image data):

(1) monochromatic (entire black and white image) or color original;
(2) position of the original;
(3) size of the original; and
(4) determination of each specific color area (according to the present invention).

It also makes a histogram.

The YMC converter 37 converts signals of three primary colors R, G and B of light into signals of three primary colors Y, M and C of a toner.

The UCR (under-color removal) and BP (black paint) unit 38 partly remove a portion, whereat three colors (cyan, magenta and yellow) are laid one over the other, by a value determined by multiplying by a specific coefficient, and it also applies black toner to the portion wherefrom undercolor was removed.

The color correction 39 performs color correction for toner colors Y, M, C, K in place of light colors R, G, B according to the present invention.

The filtering portion 40 improves a contrast ratio of an output image to a spatial frequency of an original image by correction MTF.

It is used to adjust the level of edge enhancement (shape/soft) and the level of smoothing to the values preset by the User.

The area separation 41 separates an image into areas of characters, lines, photographic elements and halftone screen dots. For instance, characters, photograph and halftone screen dots must be separated from each other for different processing.

The magnification/movement/processing portion 42 allows the user to preset the control values and has the following functions:

Magnification: This function is used to enlarge and reduce an image size in the vertical direction and the horizontal direction respectively.
Centering: This function is used to move an image to the center of a sheet of paper.
Cornering: This function is used to move an image to The corner of a sheet of paper.
Designation: This function is used to move a designated area to a designated position.
Masking: This function is used to erase an image within or outside of a designated area.
Center erase: This function is to erase a center black strip appearing on an original image when copying a book.
Erasing frame: This function is used to erase a black strip appearing at the periphery of an original image when copying a book.
Erasing outside: This function is used to erase an area outside the original image and to eliminate the possibility of blackening the periphery of the original image when copying the book with an open cover (see the frame erasing function).
Image insertion: This function is used to copy an original with another original's part placed on a blank thereof.
Superimposing: This function is used to copy an original with an other original's part placed thereon.
Image composing: This function is used to copy an original with a plurality of photographs placed on a designated portion thereof.
Paint: This function is used to paint out a specific area of an original image in a specific color.
Under color: This function is used to paint the ground surface of a designated area in a designated color.
Mirror image: This function is used to copy an original image reversed right side left.

The gray level converter 43 works with control values preset by a user to perform the following functions;

(1) Negative/Positive: This function is used to convert a negative into a positive and vice versa.
(2) Ground removal: This function is used to determine a threshold from a histogram (obtained at the time of pre-scanning) and remove or thin a ground color only.

The editing area generator 34 generates an area used for editing an image to be copied.

The halftone processing portion 45 converts half of the tone image data into area-gradient data by error diffusion or dither. This data is transferred into the printer 46.

Figure 13:
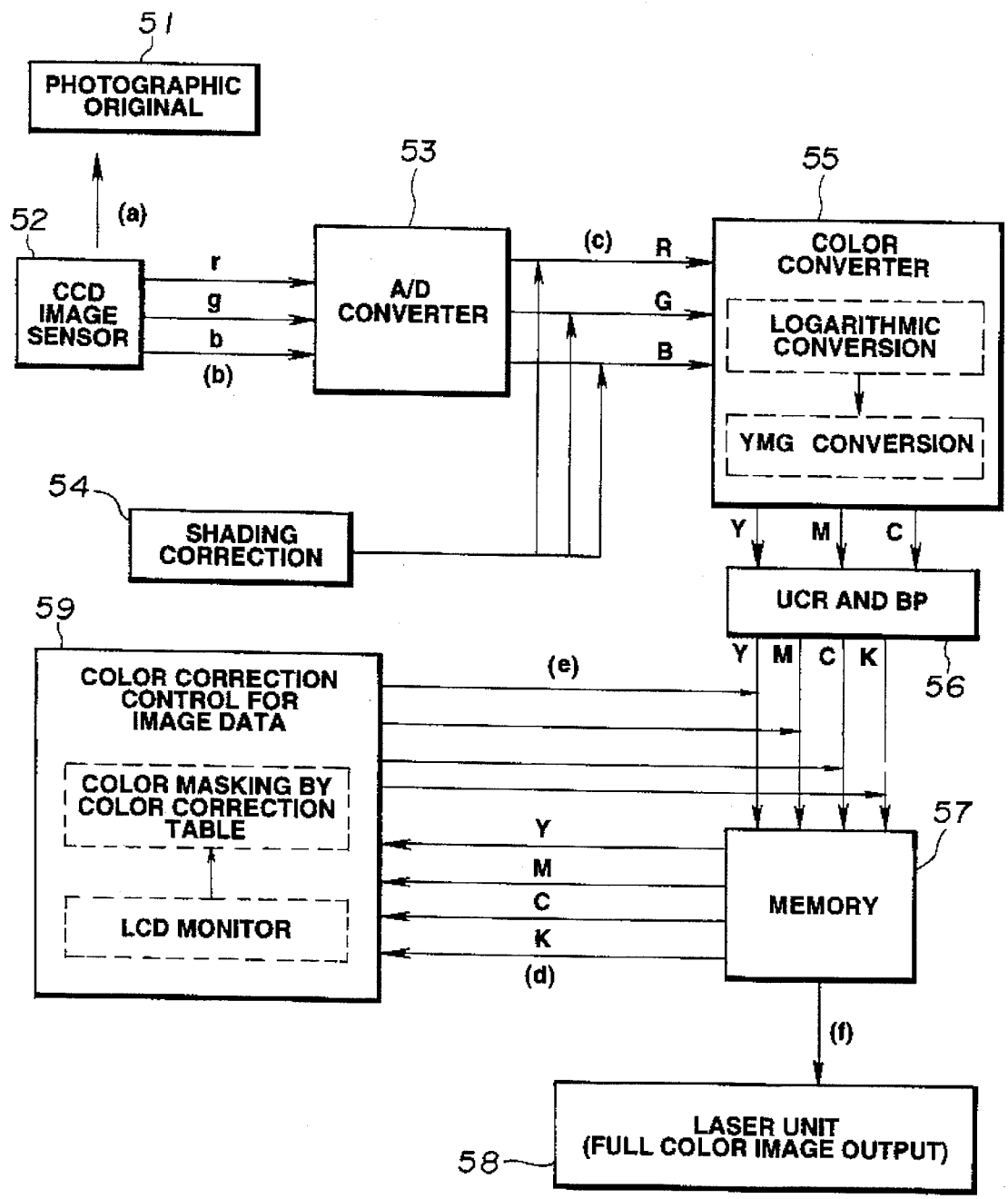
FIG. 13 shows another embodiment of an image forming device according to the present invention.

FIG. 13 shows another embodiment of an image-forming device according to the present invention (claimed in claim 7), wherein numeral 51 designates a photographic (image) original, and which comprises a CCD image sensor 52, an A-D converter 53, a shading correction 54, a color converter 55, a UCR (under-Color Removal) and BP (Black Paint) portion 56, a memory 57, a laser unit 58 and a color correcting control 59 for image data.

The CCD image sensor 52 scans original image 51 (step a) by photoelectrically converting and sampling the image data therefrom and transferring the sampled image data "r", "g" and "b" to the A-D converter 53 (step b) which in turn converts the analog image data into digital signals R, G, B by quantization. These digital signals, which include an error induced by variations of CCD elements and uneven luminosity of a lamp, are corrected in the shading correction 54 and then transferred to the color converter 45 (step c) which in turn converts the digital image signals into those having a gray level suitable for the visual property of the human eye by logarithmic conversion. This is called a gray level conversion.

The output signal of the CCD is linear to the original 51 but is logarithmically felt by the human eye. Accordingly, a logarithmic unit of the color converter 55 makes the signal have a gray level suitable to the human eye through logarithmic correction, and a YMC unit converts three primary colors (R, G, B) of light into three primary colors (Y, M, C) of toner. The UCR and BP portion 56 performs under-color removal from the converted data and black painting therein and then inputs the processed data into the memory 57 wherein they are temporarily stored. In the conventional system, the digital image data is subsequently read out from the memory and output to reproduce a full-color image, and color correction is conducted by the use of a regular color correction table only.

In the device according to the present invention, the image data stored in the memory 57 may be freely corrected for color quality according to the user's requirement. The image data from the memory 57 are output to a display terminal (CRT display) or a LCD unit (which the digital copying machine is provided with) (step d). With an image on the display screen, the user may designate a specific color area thereof, which must be most finely reproduced on the full-color copy, and correct the specific color of the partially extracted area by color masking according to a color correction table for said specific color, and correct the rest image data (other than the specific) by entire color masking according to a normal correction table. The finally corrected image data is stored again in the memory 57 (step e). The above-mentioned processing is carried out under the control of the color correction control 59.

Figure 14:
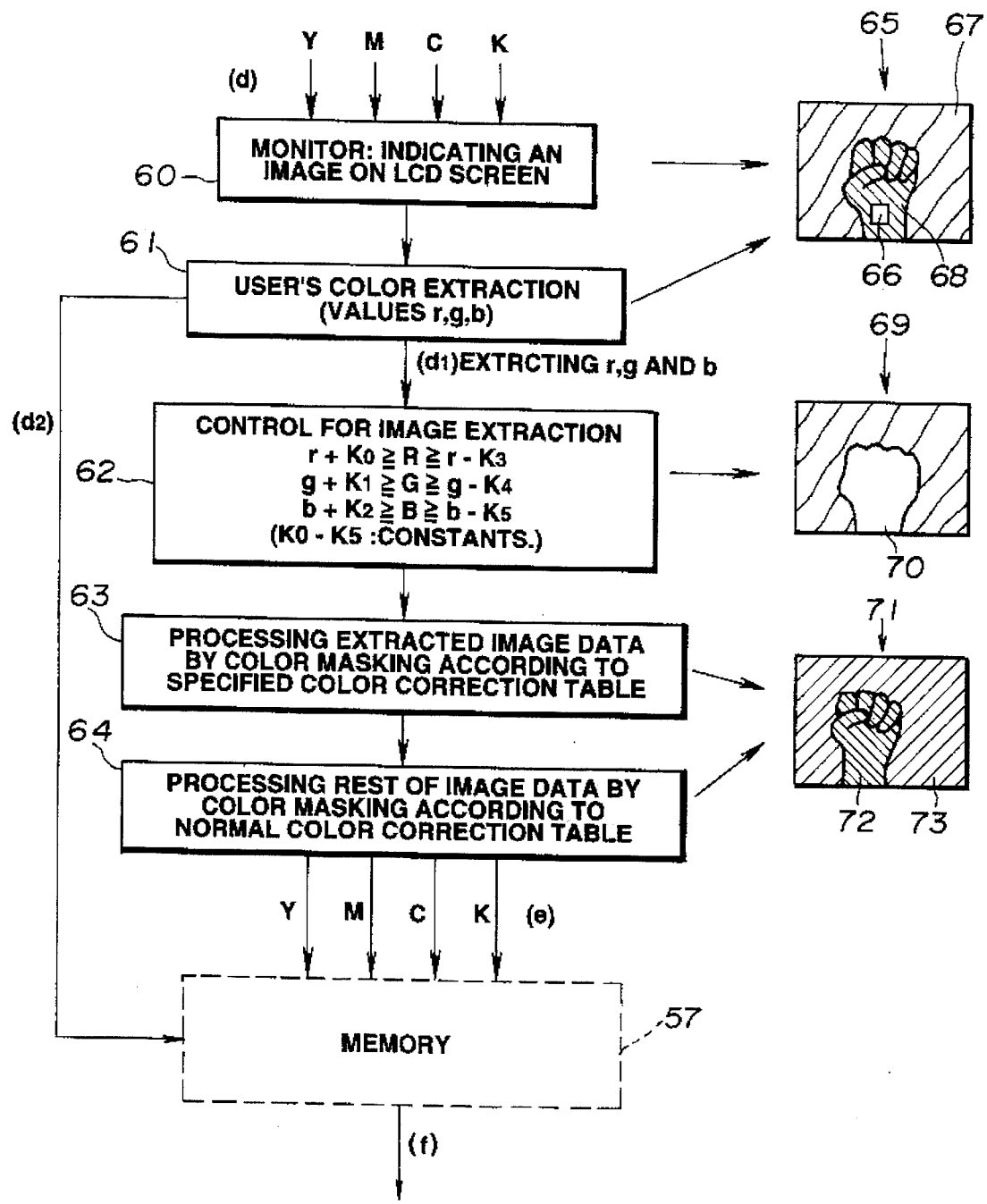
FIG. 14 is a construction view of a control portion for the color correction of an image's data.

FIG. 14 is a construction view of the color correcting control shown in the system of FIG. 13. The control unit is composed of an image display monitor 60, a user's color extraction 61, an image-extraction control 62 and color masking portions 63 and 64. In FIG. 14, numeral 65 designates an image data including a color portion to be corrected 66, a background image data 67 and an image of hand 68; numeral 69 designates an extracted image including an extracted part 70; and numerals 71,72,73 indicate a corrected image data.

The image data Y,M,C,K from the memory are output to a terminal display (CRT display) or the monitor 60 (step d) whereon the image data 65, including only the hand image 68, and the background image data 67, are now indicated. In the case where a user considers it unnecessary to further correct the image, he may end the processing (step $d_2$). The image data without any correction are stored in the memory 57. In the case when the user desires further correction of the color image of a hand 68, he selects step $d_1$ and designates, through the user's color extraction 61, the color portion 66 to be corrected. The image-extraction control 62 takes values r, g and b from the image data of the designated portion and then extracts all of the values R, G and B which are found, respectively, within $r+k_0 \geq R \geq r-k_3$, $g+k_1 \geq G \geq g-k_4$ and $b+k_2 \geq B \geq b-k_5$, where $k_0$, $k_1$, $k_2$, $k_3$, $k_4$ and $k_5$ are constants obtained by measuring some samples of the specific color. The image data 69 has a vacant portion 70 wherefrom the image data to be corrected was extracted.

The specific color of the extracted image data 70 are corrected according to a correction table prepared for said color and stored in the memory. The color masking portion 63 performs color masking of the image data 70 according to the correction table called from the memory. The corrected image data 72 is thus obtained. The image data 67, which was not extracted by the image-extraction control 62, is processed by the color masking portion 64 which in this case performs the color masking according to a normal color correction table. The obtained image data 73 completes the corrected image 71. The specific color correction table is prepared based on the data obtained by measuring many samples of the specific color. The constants $k_0, k_1, K_2, k_3, k_4, k_5$ are determined depending upon the color range of the measured color samples. The normal color correction table is prepared on the basis of the data obtained by measuring a wide range of color samples. Both the tables are effective to make an original color and a copy color be similar to each other. The corrected image data 71 is stored in the memory 57 (step e). The image data is read out from the memory and output to reproduce a full-color copy.

FIGS. 15A,15B,15C,15D,15E,15F are a view for explaining how to designate a specific color according to the present invention.

Let us assume that an original image is scanned by a CCD image sensor and thus obtained image data is output to a LCD, thereby image data, as shown in FIG. 15A, is now indicated on the LCD screen. With the conventional method, this image data is all corrected by the use of a normal color correcting table prepared on the basis of the data obtained by measuring a wide range of color samples. The present invention proposes to use, in addition to the normal color correcting table, a specific color correcting table prepared especially for the specific color on the basis of the data obtained by measuring many samples of said color in order to improve the color and image quality of the full-color copy.

As mentioned above, the color correction system, according to the present invention uses two kinds of color correction tables for normal color correction and for specific color correction, which may be used both, or not, on the request of the user. When the user does not select two tables, the color correction is conducted according to the normal color correction table only. In case of using two color correction tables, the user has to extract the specific color. In the image data as shown in FIG. 15A, which contains mountains, sky and clouds, only sky-blue belongs to the category of the specific color and, therefore, is designated by a cursor "a" as shown in FIG. 15B to obtain color data "r", "g", "b" of the sky blue color. According to the data obtained, an area of the specific color (R, G, B) is extracted as shown in FIG. 15C. The color (R, G, B) extraction area is determined on condition of $r+k_0 \geq R \geq r-k_3$, $g+k_1 \geq G \geq g-k_4$ and $b+k_2 \geq B \geq b-k_5$. If any color, other than sky-blue in the image data as shown in FIG. 15A is selected by the cursor "a", it cannot be extracted because the extraction range is limited by the constants $k_0,k_1,k_2,k_3,k_4,k_5$ to allow only the specific color to be extracted. The image data as shown in FIG. 15C of only the extracted sky-blue color is corrected by color masking according to the specific color correcting table, while the image data as shown in FIG. 15D of the not-extracted color portion is corrected by color masking according to the normal color correction table. These two processings, as shown in FIG. 15E may be simultaneously conducted in a computer and the finally corrected image data, as shown in FIG. 15F, is displayed on the LCD screen.

The above-mentioned control system for the color correction of image data may be built in a full-color digital copying machine which, by virtue of this, may produce high-quality full-color copies and operate with improved reliability.

We claim:

1. An image forming device comprising:

a color image inputting portion;

a color image printing portion and a color correcting portion for reducing a color difference between an original image and a printed-out image, wherein said color correcting portion performs the color correction by matrix computation according to a color correcting factor defined by multiple-regression analysis, wherein the device is provided with a plurality of data for color correction and a means for selectively switching color correction data according to the original image, and further wherein the total time of color correction for an original having a first area of a specific color is longer than the time of color correction for an original having an area of a specific color smaller than said first area.

2. An image forming device comprising:

a color image inputting portion;

a color image printing portion and a color correcting portion for reducing a color difference between an original image and a printed-out image, wherein said color correcting portion performs the color correction by matrix computation according to a color correcting factor defined by multiple-regression analysis, wherein the device is provided with a plurality of data for color correction and a means for selectively switching color correction data according to the original image, and further wherein a correction factor to be used for color correction by matrix computation in the color correcting portion is user-selectable between: factors determined by multiple-regression analysis and other factors.

* * * * *